(12) United States Patent
Röder

(10) Patent No.: US 6,336,664 B1
(45) Date of Patent: Jan. 8, 2002

(54) SEAT-BELT SYSTEM

(75) Inventor: Thomas Röder, Beilstein (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/625,470

(22) Filed: Jul. 25, 2000

(30) Foreign Application Priority Data

Jul. 27, 1999 (DE) ........................................ 199 35 248

(51) Int. Cl.⁷ .............................................. B60R 22/36
(52) U.S. Cl. ...................................... 280/806; 297/480
(58) Field of Search ........................ 280/806, 807; 297/480

(56) References Cited

U.S. PATENT DOCUMENTS 3,845,836 A * 11/1974 Bendler et al.
6,145,881 A * 11/2000 Miller et al.
6,155,512 A * 12/2000 Specht et al.

FOREIGN PATENT DOCUMENTS

DE 3518125 A * 11/1986
DE 43 24 967 A1 7/1993

* cited by examiner

*Primary Examiner*—Paul N. Dickson
(74) *Attorney, Agent, or Firm*—Crowell & Moring LLP

(57) ABSTRACT

A seat-belt system for motor vehicles, having an automatic seat-belt winder which guides the seat-belt band and is guided in a height-adjustable manner in an essentially vertical sliding guide arranged on the vehicle frame, having a locking device which locks the automatic seat-belt winder in a functional initial position in the sliding guide and opens the lock in the event of a collision, having a seat-belt tightening mechanism which, when the lock is opened, displaces the automatic seat-belt winder in the sliding guide in an opposed direction to the direction of the seat-belt band and the tensile forces acting on it due to the collision, until the seat-belt band is sufficiently tightened, and having a seat-belt force limiting mechanism which limits, in a specified manner, the tightening of the seat-belt band brought about by the seat-belt tightening mechanism, a resetting mechanism which, after the end of the collision, if tensile forces no longer act on the seat-belt band, guiding the automatic seat-belt winder back into its functional initial position in the sliding guide where it is locked again.

19 Claims, 4 Drawing Sheets

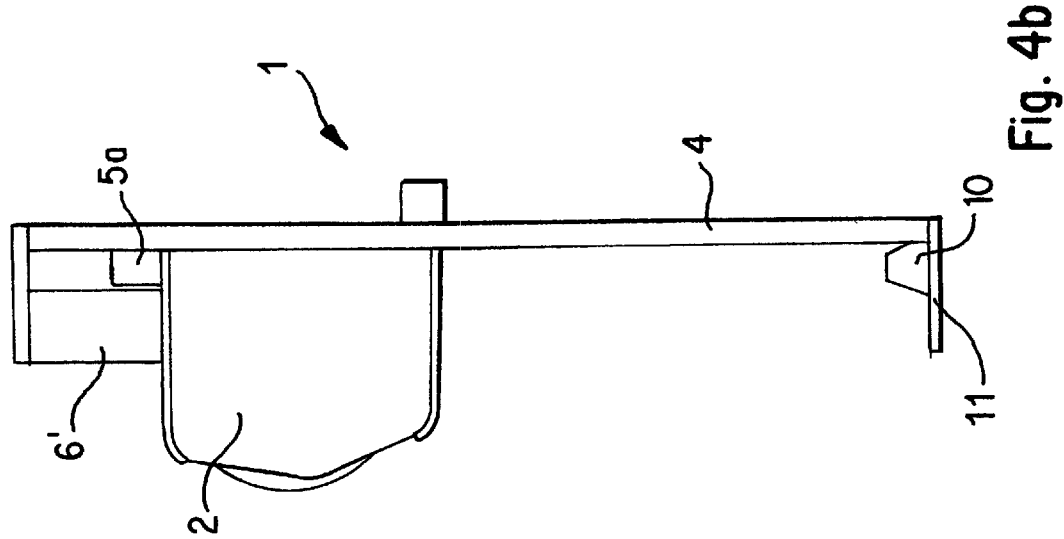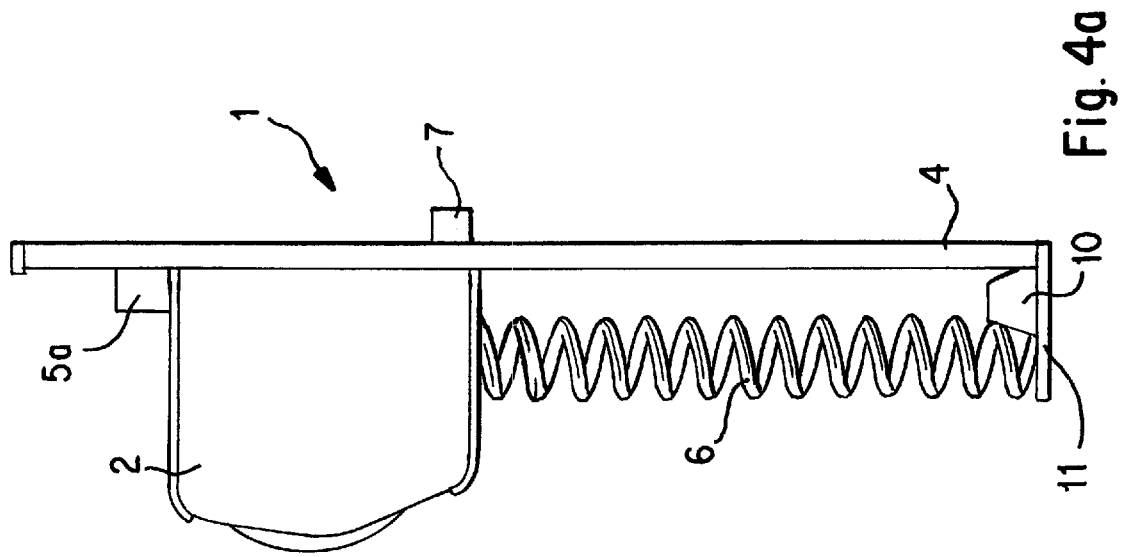

ated mass of the occupant can be restrained to a sufficient extent.
SEAT-BELT SYSTEM The invention relates to a seat-belt system for motor vehicles, and more particularly to a seat-belt system having integrated seat-belt tightening and seat-belt force limiting.

BACKGROUND

Seat-belt systems serve to comprehensively protect occupants in motor vehicles in the event of collisions and generally consist of a combination of a shoulder-belt band guided diagonally over the occupants shoulder and of a lap-belt band guided horizontally in the occupants lap region.

The seat-belt systems known from the current, relevant prior art are customarily equipped with a mechanism for belt tightening and a mechanism for belt force limiting, which mechanisms can optionally also be combined in one device. The belt tightening serves, after the onset of the acceleration forces which occur due to the collision and act on the occupant, to tighten the seat belt without a substantial time delay to such an extent that the abruptly accelerated mass of the occupant can be restrained to a sufficient extent.

However, this belt tightening cannot readily be maintained during the course of the acceleration of the body caused by the collision without at least to a certain extent being of flexible configuration, since serious injuries in the chest region would not be able to be avoided because of the order of magnitude of the forces acting here on the occupant.

An additional belt force-limiting mechanism, or even one integrated in the belt-tightening mechanism, is therefore generally provided, which mechanism limits the force on the occupant produced by the tightening, specifically to such an extent that firstly injuries are prevented and secondly it is ensured that the occupant is still sufficiently restrained. Starting from a certain limiting value of the tensile forces acting on the belt band due to the collision, which limiting value is usually established in the region of 4.5 kN, the mechanism for belt force limiting makes it possible for the belt tightening to yield up to a certain degree and this, together with the stretchability due to the material inherent to the belt band, causes a slight deceleration, preventing serious injuries, in the restraining action on the occupant.

The technical solutions for devices for seat-belt tightening and seat-belt force limiting are generally very complicated in the current prior art because of the kinematics which have to be taken into consideration, and are therefore realized at considerable expense.

For example, German patent DE 43 24 967 discloses a seat-belt restraint device similar to the generic type. The belt is tightened here via a self-blocking automatic seat-belt winder whose blocking, and therefore tightening, of the belt band is coordinated by a belt-band-sensitive control system. The seat-belt force limiting takes place with the interconnection of a deformation element in the form of a torsion bar. The automatic seat-belt winder is arranged such that it can be displaced with respect to the associated vehicle frame. In the event of a collision, the self-blocking automatic seat-belt winder blocks further extraction of the belt band, as a result of which the said winder is then displaced with respect to the vehicle frame. Its displacement is associated with a rotation of toothed wheels which are arranged indirectly on the housing of the automatic seat-belt winder and roll along a corresponding toothing on the vehicle frame, the torsion bar being indirectly connected to the gear wheels in a rotationally fixed connection. The rotation of the torsion bar leads in turn to deformation work and therefore, by association, to a desired reduction in the load level acting on the seat-belt band.

In addition to the relatively complicated structure, this seat-belt restraint device has the substantial disadvantage of only being in the functional state once. In the event of being overstressed due to a collision, the torsion bar is destroyed in order to limit the belt force and is therefore no longer available for a subsequent use. However, this circumstance has proven extremely disadvantageous in the problem of "secondary collisions", for example in the case of pile-ups where the vehicle can under some circumstances be abruptly accelerated and braked a number of times. However, it is precisely for such cases that it is desirable always to have available a functional seat-belt restraint system which is able, after a "first collision" has taken place, also to securely support the occupant at any time during immediate "subsequent collisions".

SUMMARY OF THE INVENTION

Taking this problem encountered in the described prior art as a starting point, the object of the present invention is to provide a seat-belt system having seat-belt tightening and seat-belt force limiting, which system is functionally available in its entirety after one use without any restrictions and at any time for subsequent uses. Moreover, an aim of the invention is to realize a structurally simple and therefore cost-effective seat-belt system.

A seat-belt system according to the invention is based on a reversible design of the seat-belt system of the generic type enabling the said system to be returned into the functional initial state.

Compared to the prior art, the seat-belt system according to the invention has the substantial advantage that it can be transferred at any time into its functional initial state, so that an "active" seat-belt system is always available for a number of successive collisions.

A further advantage of the invention resides in the fact that only simple machine components are required for the achievement according to the invention of the reversible design of the seat-belt system, the said components being combined with one another using a simple construction, which assists cost-effective manufacturing.

In an advantageous refinement of the invention, an automatic seat-belt winder whose design and functioning is adequately known from the prior art is guided in a height-adjustable manner in a vertical sliding guide on a vehicle frame, customarily the B-pillar of the motor vehicle, and is positioned releasably there in a suitable manner. In this arrangement, one or more spring devices, the end of which is fastened to a suitable location on the sliding guide, can be attached to a lower side of the housing of the automatic seat-belt winder.

In this case, in a preferred embodiment of the seat-belt system, a spring device is designed as a tension spring, in particular as a conventional helical spring which, depending on the position, retained by the locking device, of the automatic seat-belt winder in the sliding guide, is present in a state stretched beyond the normal length, so that a pre-tension arises which depends on the kinematic parameters to be taken into consideration, for example of the abovementioned tensile-force limiting value, and is correspondingly obtained via the configuration of the spring characteristic.

The seat-belt system is operational in the locked state. In the event of a collision of the motor vehicle whose strength exceeds a specified release limiting value, the locking device, for example in the form of a reversible latching means, is activated by an electronic release control device, which is usually coupled to the airbag triggering means, so that the locking device opens and releases the automatic seat-belt winder.

When pretension of the tension spring prevails, the automatic seat-belt winder is pulled downwards by the latter in the sliding guide, i.e. in an opposed direction to the direction of the seat-belt band and the tensile forces acting on it due to the collision. The belt band is thereby tensioned and any belt slack which is present is eliminated. It can be seen that via the design according to the invention with a spring device under pretension a mechanism for belt tightening is provided in a functionally and technically simple manner.

During the further course of the collision, the tensile forces acting on the seat-belt band are increased considerably. If the tensile forces are greater than the rate of the spring device, the latter will correspondingly yield, which results in a reduction in the restraint force exerted on the occupant by the seat-belt band and therefore in the load of the said band. It is clear that via the interaction between the spring forces and the tensile forces due to the collision, the seat-belt force-limiting function is fulfilled by the spring device.

The interaction of the forces is oriented to the level of the specified belt-tightening limiting value which is set at about 4.5 kN. Accordingly, the threshold of use and therefore the time of the seat-belt force limiting can be determined according to the invention in a very simple manner via a corresponding configuration of the particular spring rates.

In a further embodiment of the seat-belt system according to the invention, at least one compression spring can be provided instead of a tension spring. In a preferred embodiment, this compression spring can be designed as a gas compression spring.

A spring device operating under compression has accordingly to be arranged in the sliding guide above the automatic seat-belt winder, i.e. in the direction of the seat-belt and the tensile forces acting on it due to the collision. If the compression spring is a conventional helical spring, it is of course, in the functional initial position of the automatic seat-belt winder, in a state compressed below the normal length in order to produce the pretension necessary for belt tightening. If, in the event of a collision, the automatic seat-belt winder is released from the locking device, it is accordingly displaced downwards in the sliding guide by the compression or gas compression spring in an opposed direction to the tensile forces acting on the belt band. In order to prevent the helical spring from buckling, the latter can additionally be guided in this case in a vertically supported manner in the sliding guide.

It is clear that in the case of the seat-belt system spring devices of the most varied design can be used and, according to the invention, displacement of the automatic seat-belt winder can be brought about with them until the decisive limiting value for belt force limiting is reached. In general, spring devices consisting of a plurality of combined springs having different, progressive and/or degressive spring characteristics are conceivable, for example a plurality of tension and/or compression springs connected in a row or in series, the common configuration of the resulting spring action always being oriented to the kinematics to be taken into consideration in the event of a collision.

Since over the course of the collision the belt band is first of all tightened by the spring device of the seat-belt system and subsequently its restraining force has been limited, the seat-belt system is usually no longer in the functional initial state. At the end of the collision a tensile force caused by the acceleration of the occupant no longer acts on the belt band, so that only the spring force still acts on the automatic seat-belt winder. If the latter has then to be guided back into its functional initial position, these spring forces have to be overcome.

For this purpose, the seat-belt system according to the invention has a resetting mechanism which, after the end of a collision which has taken place, transfers the automatic seat-belt winder into its original position in the sliding guide, the spring device again being set under the specified pretension. The automatic seat-belt winder is fixed again in its functional initial position by means of the locking device and is therefore available to be used again for a subsequent collision. This procedure can be repeated as often as desired. Owing to the design according to the invention, the seat-belt system is distinguished by unlimited reversibility.

As regards its arrangement, the resetting mechanism can be arranged on the automatic seat-belt winder below or above it, in which case it is displaced together with the latter during the collision. As an alternative to this, the resetting mechanism can also be arranged on the sliding guide below or above the automatic seat-belt winder and can be connected rigidly to the said sliding guide, in which case corresponding, movable returning means connect the resetting mechanism to the automatic seat-belt winders.

The resetting mechanism can be realized using electrical and/or hydraulic and/or pneumatic devices adequately known from the prior art.

In a preferred embodiment of the seat-belt system, the resetting mechanism is arranged on the automatic seat-belt winder and can be designed as an electric motor which has a toothed-wheel drive. In order to return the automatic seat-belt winder, one or more toothed wheels of the electric motor can roll along a complementary toothed profile which is arranged rigidly in the sliding guide. During the belt-tightening process the toothed-wheel drive is then in the idling position. The toothed profile can be brought about, for example, via a toothed rack arranged vertically in the sliding guide or via a corresponding punched-out area and profiled structure of the metal plate of the sliding guide.

If the electric motor is situated rigidly on the sliding guide above the automatic seat-belt winder, a suitable traction cable which pulls the automatic seat-belt winder upwards can be used as the return means.

Instead of an electric motor it is, of course, also possible to use a pneumatic turbine which is known per se from the prior art, is activated via the pneumatic system of the motor vehicle and can drive a toothed-wheel gear mechanism, a cable winch or similar means.

The resetting mechanism fastened to the sliding guide can alternatively also be designed as a pneumatic or hydraulic pressure cylinder, in which case the automatic seat-belt winder can be displaced via a corresponding adjusting rod acting on it.

BRIEF DESCRIPTION OF THE DRAWINGS

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which:

FIG. 4a shows a schematic side-view illustration of an exemplary embodiment of the seat-belt system with a pneumatic/hydraulic resetting mechanism, arranged on and above an automatic seat-belt winder;

FIG. 4b shows the exemplary embodiment shown in FIG. 4a with a compression spring instead of a tension spring; and

DETAILED DESCRIPTION

Figure 1:
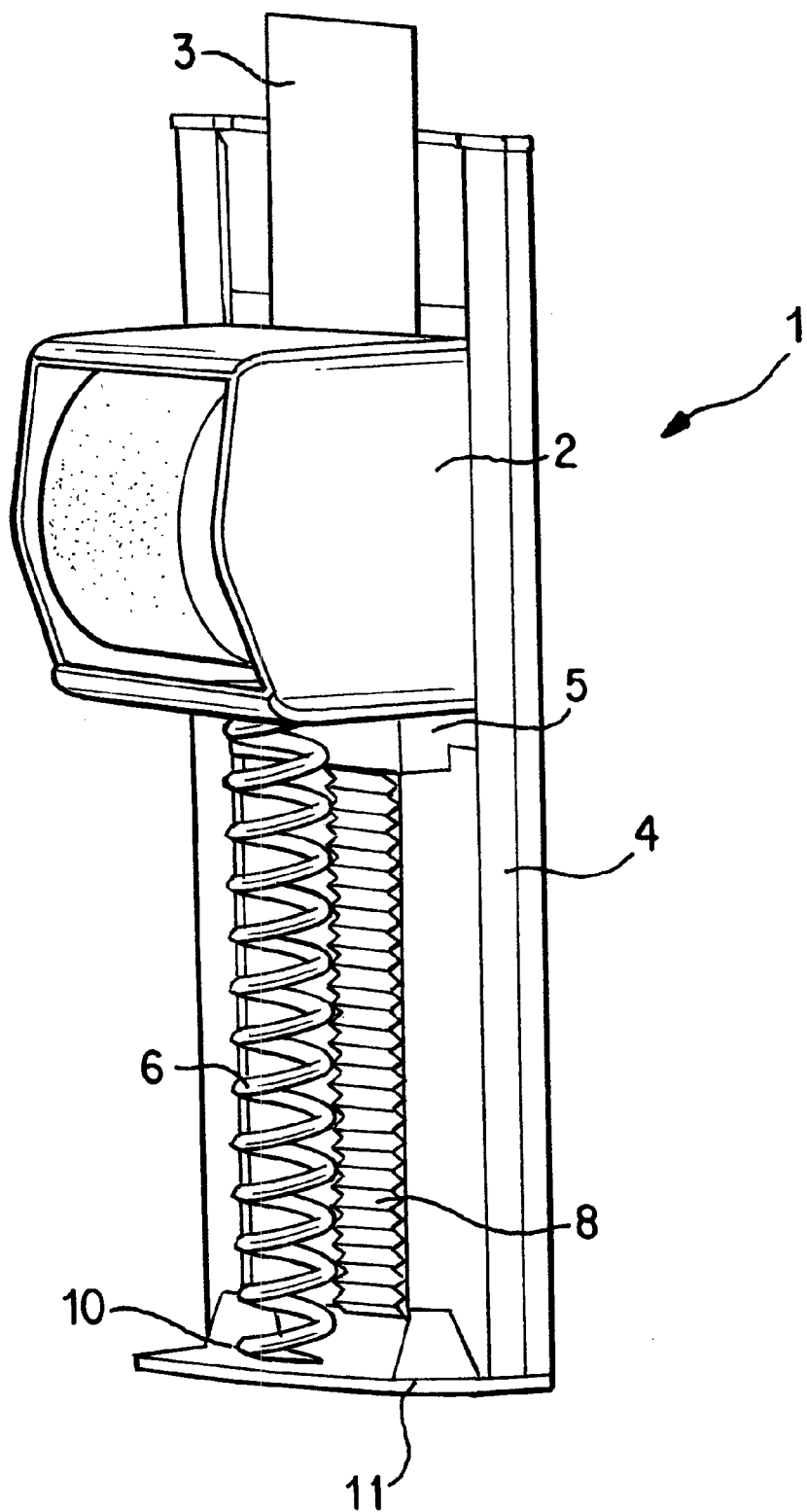
FIG. 1 shows a schematic three-dimensional illustration of an exemplary embodiment of the seat-belt system with an electric motor, resetting mechanism, arranged on and below an automatic seat-belt winder, and a toothed rack as the return means.

A seat-belt system 1 shown in FIG. 1 has an automatic seat-belt winder 2 which guides a belt band 3. The automatic seat-belt winder 2 is guided in a height-adjustable manner in a C-shaped sliding guide 4. The sliding guide 4 itself is arranged on a B-pillar (not illustrated in further detail) of a vehicle frame.

Figure 2B:
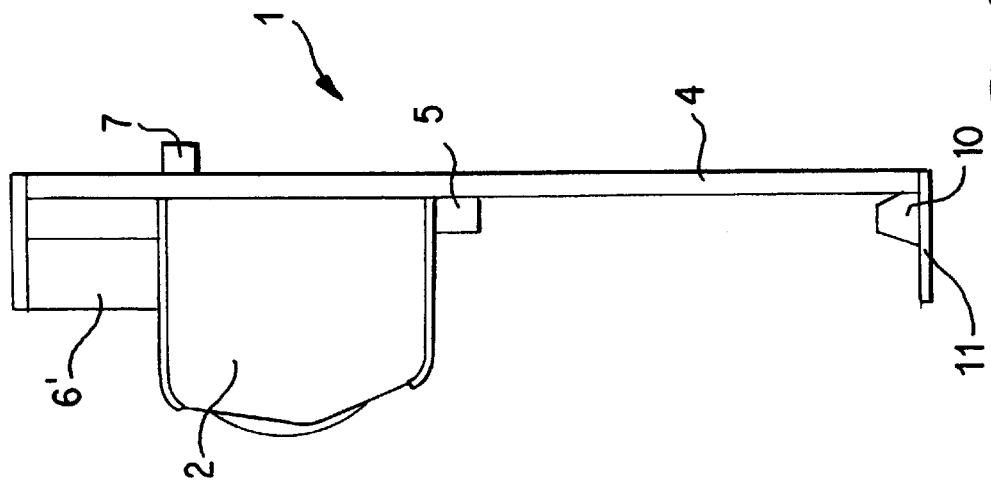
FIG. 2b shows a side view of the exemplary embodiment shown in FIG. 1 with a compression spring instead of a tension spring.
Figure 2A:
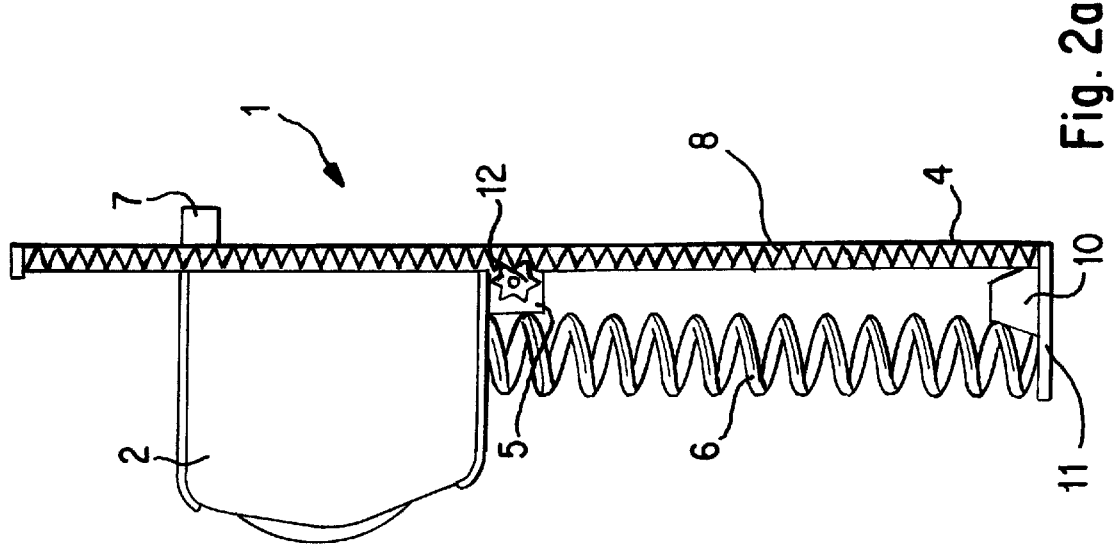
FIG. 2a shows a side view of the exemplary embodiment shown in FIG. 1 showing the toothed wheel of the automatic resetting device.

The automatic seat-belt winder 2 is fixed in a specified, functional initial position by a locking device 7, as shown in basic terms in FIG. 2. In the event of a collision, the locking device 7 is activated by a release control device (not shown), opens and releases the automatic seat-belt winder 2.

Acting on the lower side of the housing of the automatic seat-belt winder 2, i.e. on the side opposite the belt band 3, is a helical spring 6, which is supported at its opposite end on a flange 11 which is perpendicular to the sliding guide 4 and seals off the latter. In the initial position of the automatic seat-belt winder 2, this helical spring 6 is under pretension. When the locking device 7 is opened, this helical spring 6 pulls the automatic seat-belt winder 2 downwards, producing the seat-belt tightening. As shown in FIGS. 2b and 4b, a compression spring 6' can be used instead of the helical spring.

On its lower side the automatic seat-belt winder 2 has the resetting mechanism, designed as an electric motor 5 or as a hydraulic or pneumatic device 5a. Arranged in the interior of the electric motor resetting mechanism 5 is a toothed-wheel gear mechanism 12 whose toothed wheel rolls along a toothed rack 8. In this case, the toothed rack 8 is arranged in the centre of the sliding guide 4. Turing the belt-tightening process the resetting mechanism 5 is in idling mode and the toothed wheel rolls along the profile of the toothed rack 8 without resistance, whereas during the return process the toothed wheel actively engages in the toothed rack 8 and thereby moves the automatic seat-belt winder 2 upwards in the sliding guide 4.

Figure 3:
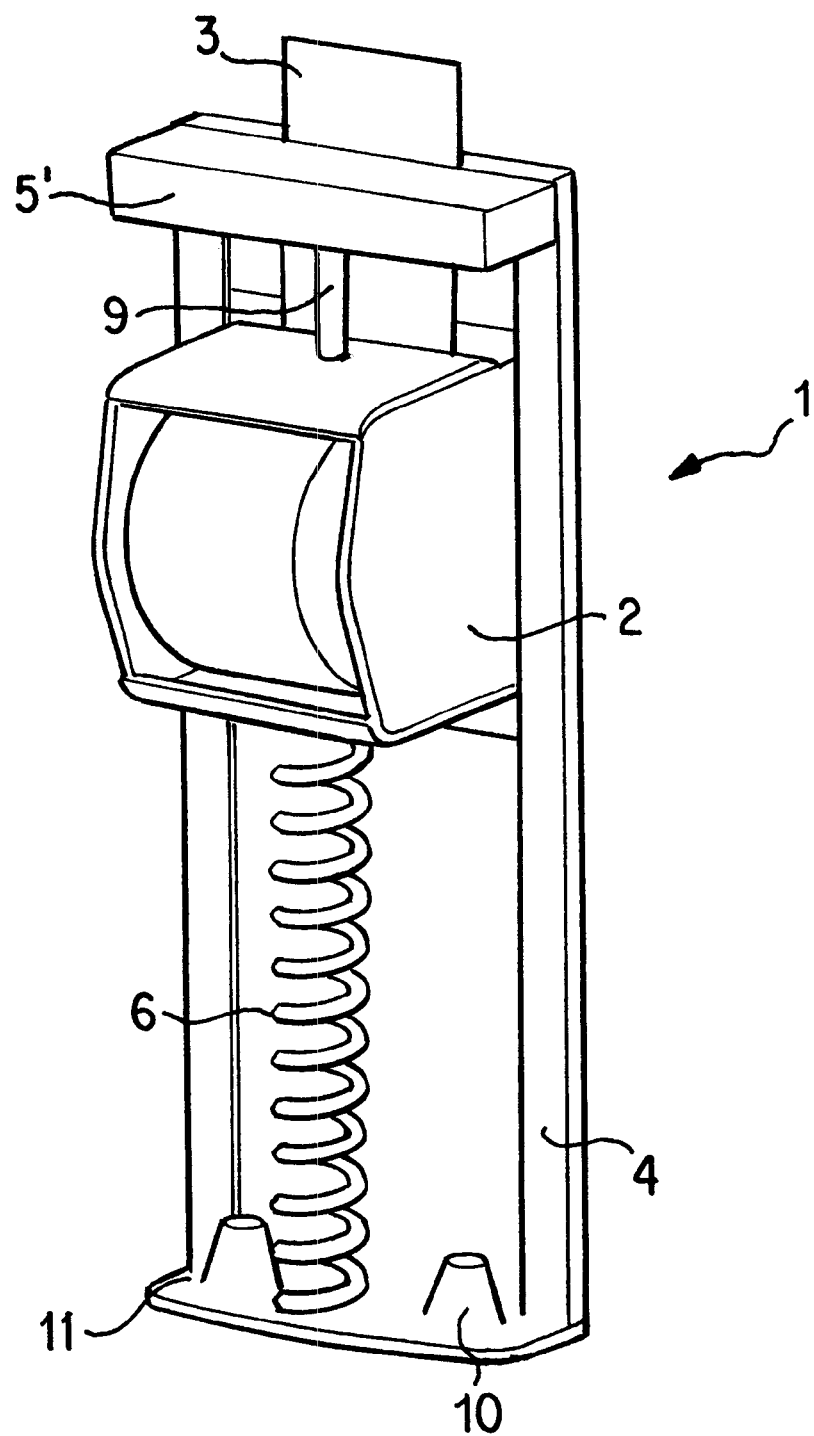
FIG. 3 shows a schematic three-dimensional illustration of a further exemplary embodiment of the seat-belt system with a resetting mechanism, arranged on the sliding guide above the automatic seat-belt winder, a tension spring, and a winch and traction cable as the return means.

In a further exemplary embodiment of the seat-belt system 1, as reproduced in FIG. 3, an alternative resetting mechanism 5' to the design according to FIG. 1 and FIG. 2 is arranged above the automatic seat-belt winder 2 and fastened to the sliding guide 4. In this design, a traction cable 9 and winch 13, which pull the automatic seat-belt winder 2 upwards, are used as the return means.

The sealing flange 11 has two limiting stops 10 in order to limit the downward sliding movement carried out by the automatic seat-belt winder 2 during the belt tightening.

Although the invention has been described in detail with reference to certain preferred embodiments and specific examples, variations and modification exist within the scope and spirit of the invention as described and as defined in the following claims.

What is claimed is:

1. A seat-belt system for motor vehicles, comprising:
   (a) a seat-belt band;
   (b) an automatic seat-belt winder which winds, and guides the seat-belt band, the automatic seat-belt winder guided in a height-adjustable manner in an essentially vertical sliding guide arranged on a frame of the vehicle;
   (c) a locking device coupled to the automatic seat-belt winder and the vertical sliding guide which locks the automatic seat-belt winder in a functional initial position in the vertical sliding guide and which releases the automatic seat-belt winder in the event of a collision;
   (d) a seat-belt tightening mechanism coupled to the automatic seat-belt winder which, when the automatic seat-belt winder is released, displaces the automatic seat-belt winder in the vertical sliding guide in an opposed direction to the direction of the seat-belt band and the tensile forces acting on it due to the collision to tighten the seat-belt band;
   (e) a seat-belt force limiting mechanism coupled to the seat-belt tightening mechanism which limits the tightening of the seat-belt band brought about by the seat-belt tightening mechanism; and
   (f) a resetting mechanism coupled to the automatic seat-belt winder which, after the end of the collision and the action caused thereby of tensile forces on the seat-belt band, guides the automatic seat-belt winder back into its functional initial position in the vertical sliding guide where it is locked again.

2. The seat-belt system according to claim 1, wherein the seat-belt tightening mechanism includes a spring device which is arranged between the vertical sliding guide and the automatic seat-belt winder.

3. The seat-belt system according to claim 2, wherein the spring device is a tension spring which is arranged in the vertical sliding guide below the automatic seat-belt winder in an opposed direction to the direction of the tensile forces acting on the seat-belt band in the event of a collision.

4. The seat-belt system according to claim 2, wherein the spring device is a compression spring which is arranged in the vertical sliding guide above the automatic seat-belt winder in the direction of the tensile forces acting on the seat-belt band in the event of a collision.

5. The seat-belt system according to claim 4 wherein the compression spring is a gas compression spring.

6. The seat-belt system according to claim 2, wherein the strength of the seat-belt tightening and seat-belt force limiting can be fixed individually by configuring the spring rate of the spring device.

7. The seat-belt system according to claim 1, wherein the resetting mechanism is one of an electrical and pneumatic and hydraulic resetting mechanism.

8. The seat-belt system according to claim 7, wherein the resetting mechanism is arranged on the automatic seat-belt winder in the direction of the tensile forces acting on the seat-belt band in the event of collision.

9. The seat-belt system according to claim 8, wherein the resetting mechanism has an electric motor having a toothed wheel drive, the toothed wheel engaging a toothed profile arranged vertically in the sliding guide.

10. The seat-belt system according to claim 9, wherein the toothed profile is a separate toothed rack.

11. The seat-belt system according to claim 8, wherein the resetting mechanism is arranged on the vertical sliding guide in the direction of the tensile force acting on the seat-belt band in the event of a collision.

12. The seat-belt system according to claim 11, wherein the resetting mechanism has an electric motor having a winch and at least one traction cable which acts on the automatic seat-belt winder.

13. The seat-belt system according to claim 8, wherein the resetting mechanism is arranged below the automatic seat belt winder.

14. The seat-belt system according to claim 8, wherein the resetting mechanism is arranged above the automatic seat belt winder.

15. The seat-belt system according to claim 11, wherein the resetting mechanism is arranged below the automatic seat belt winder.

16. The seat-belt system according to claim 11, wherein the resetting mechanism is arranged above the automatic seat belt winder.

17. The seat-belt system according to claim 7, wherein the resetting mechanism is arranged on the vertical sliding guide in the direction of the tensile forces acting on the seat-belt band in the event of a collision.

18. The seat-belt system according to claim 17, wherein the resetting mechanism is arranged below the automatic seat belt winder.

19. The seat-belt system according to claim 17, wherein the resetting mechanism is arranged above the automatic seat belt winder.

* * * * *